United States Patent
Shiue et al.

(10) Patent No.: US 6,661,643 B2
(45) Date of Patent: Dec. 9, 2003

(54) DEIONIZERS WITH ENERGY RECOVERY

(75) Inventors: Lih-Ren Shiue, Hsinchu (TW); Abel Sun, Taipei (TW); Chia-Chann Shiue, Lungtan Shiang (TW); Fei-Chen Hsieh, Shi Chiu (TW); Yu-His Hsieh, Changhua (TW); Jiung-Jau Jou, Miaoli Hsien (TW)

(73) Assignee: Luxon Energy Devices Corporation, Hsinchu (TW)

( * ) Notice: Subject to any disclaimer, the term of this patent is extended or adjusted under 35 U.S.C. 154(b) by 0 days.

(21) Appl. No.: 10/273,747

(22) Filed: Oct. 18, 2002

(65) Prior Publication Data

US 2003/0063430 A1 Apr. 3, 2003

Related U.S. Application Data

(62) Division of application No. 10/109,825, filed on Mar. 27, 2002, now Pat. No. 6,580,598.

(51) Int. Cl.[7] ................................ H01G 9/00
(52) U.S. Cl. ................ 361/502; 361/503; 361/504; 361/512; 361/516; 363/131; 363/132
(58) Field of Search ............... 361/514, 517, 361/502, 306.1, 512, 301.3, 303, 531, 520, 508, 516, 503, 504; 363/132, 131

(56) References Cited

U.S. PATENT DOCUMENTS

| | | | | |
|---|---|---|---|---|
| 6,021,040 | A | * | 2/2000 | Suzuki et al. |
| 6,183,718 | B1 | * | 2/2001 | Barker et al. |
| 6,215,679 | B1 | * | 4/2001 | Yamane et al. |
| 6,280,883 | B1 | * | 8/2001 | Lamanna et al. |

* cited by examiner

Primary Examiner—Dean A. Reichard
Assistant Examiner—Ha Nguyen
(74) Attorney, Agent, or Firm—J. C. Patents

(57) ABSTRACT

Deionizers using the electrode configurations of electrochemical capacitors are described, wherein the deionizing process is called capacitive deionization (CDI). During deionization, a DC electric field is applied to the cells and ions are adsorbed on the electrodes with a potential being developed across the electrodes. As electrosorption reaches a maximum or the cell voltage is built up to the applied voltage, the CDI electrodes are regenerated quickly and quantitatively by energy discharge to storage devices such as supercapacitors. In conjunction with a carousel or Ferris wheel design, the CDI electrodes can simultaneously and continuously undergo deionization and regeneration. By the responsive regeneration, the CDI electrodes can perform direct purification on solutions with salt content higher than seawater. More importantly, electrodes are restored, energy is recovered and contaminants are retained at regeneration, while regeneration requires no chemicals and produces no pollution.

7 Claims, 4 Drawing Sheets

DEIONIZERS WITH ENERGY RECOVERY

CROSS-REFERENCE TO RELATED APPLICATION

This application is a divisional application of, and claims the priority benefit of, U.S. application Ser. No. 10/109,825 filed on Mar. 27, 2002 U.S. Pat. No. 6,580,598.

References Cited

| | | |
|---|---|---|
| 4,765,874 | August 1988 | Modes et al. |
| 4,991,804 | March 1991 | Pekala |
| 5,779,891 | July 1998 | Andelman |
| 5,858,199 | January 1999 | Hanak |
| 5,954,937 | September 1999 | Farmer et al. |
| 6,051,096 | April 2000 | Nagle et al. |
| 6,168,882 | January 2001 | Inoue et al. |
| 6,267,045 | July 2001 | Wiedemann et al. |
| 6,309,532 | October 2001 | Tran et al. |
| 6,326,763 | December 2001 | King et al. |
| 6,328,875 | December 2001 | Zappi et al. |

OTHER REFERENCES

J. Newman et al, J. Electrochem. Soc., 128, PP510–517 (1971), "Desalting by Means of Porous Carbon Electrodes"

I. Parikhi; P. Cuatrecasas, C&EN, Aug., 26, 1985, PP17–32(1985), "Affinity Chromatography"

BACKGROUND OF THE INVENTION

1. Field of Invention

This invention relates generally to capacitive deionization (CDI) of liquids containing charged species, including aqueous, inorganic and organic solutions. More particularly, this invention relates to recurrent electrosorption of ions (deionization) and regeneration of electrodes whereby energy is extracted and stored in supercapacitors, ultracapacitors, or electric double layer capacitors. The present invention provides deionizors wherein purified liquids and electricity are co-generated.

2. Description of Related Art

Energy and water are two essential ingredients of modern life. Since the fossil fuel is diminishing and generates pollution at power generation, people become more eager in searching for alternative sources of energy. Therefore, renewable energy sources such as solar power, wind power, wave power, and geothermal heat have been explored and commercialized. Many international automakers are aggressively developing fuel cells for pollution-free electric vehicles. All of the above endeavors are aimed to reduce $CO_2$ emission and to use natural free resources such as sun and water for energy production. Production of energy is no easy matter, hence conservation of energy that includes controlled usage and responsive extraction of energy deserves attention. There are numerous viable ways for retrieving residual energy that would be otherwise wasted. For example, U.S. Pat. No. 6,326,763 issued to King et al disclosed a regenerative braking system that can store electricity converted from the remaining momentum of vehicle during periods of deceleration due to braking for stop or moving down hill. Ultracapacitors were proposed in '763 to extract the residual energy that is generally dissipated as heat. In another example, U.S. Pat. No. 6,267,045 issued to Wiedemann et al revealed a cooking device containing an energy storage and energy extraction system wherein energy is exchanged in the form of latent heat.

Less than 1% of water on the earth surface is suitable for direct use. Fresh water will be one of the precious commodities in the 21st century. In lieu of rainfall, desalination of seawater is probably the most plausible means to attain fresh water. Among the commercial desalination methods, distillation dominates the market with 56% share, reverse osmosis (RO) possesses 40%, while freezing and electrodialysis seize the rest. The aforementioned methods though are different in the purification mechanisms, they are all utilized to reduce the total dissolved solids (TDS) which is a measure of charged species in solutions so that seawater can become potable. Reduction of TDS, or deionization, is also an ultimate goal for waste liquid treatments where ion exchange and RO are most frequently used. In purifying seawater or waste liquids, the employed method should be a low energy-consumption, pollution-free, and long service-life technique. In fulfilling the foregoing requirements, capacitive deionization (CDI) is a superior method than ion exchange, RO, and other techniques for deionization. There are five reasons to vindicate the supreme merit of CDI: (1) CDI uses a DC electric field for adsorbing and removing ions from solutions, the process is quick and controllable with minimal energy consumption. (2) Energy that is input for electrosorption can be extracted and stored for latter use or other applications. No energy recovery is available in any of the aforementioned separation methods. (3) While energy is transferred from the CDI electrodes to a load, the electrodes are restored simultaneously. Regeneration of CDI electrodes by energy extraction is prompt without using chemicals and without producing pollution. (4) CDI can directly deionize seawater or solutions with TDS higher than 35,000 ppm. Deionization and regeneration can be repeated numerous times until the liquids are clean, and the electrodes are not degraded by the high salt content. Whereas RO, electrodialysis, and ion exchange are better utilized for treating low salt-content solutions. Otherwise, their expensive membranes or resins will be damaged quickly. (5) Ions that are adsorbed by the CDI electrodes can be discharged in a concentration reservoir for recycling useful resources or for sludge disposal. Extraction of ions by CDI is a non-destructive process, thus some ions may be processed for reuse. The invention will demonstrate all of the foregoing five unique features of the CDI technique in the latter section of detailed description. Incidentally, energy recovery in the deionizers is consistent with the ultimate principle of free energy tapping, that is, no fuel should be added and no pollutant should be emitted.

CDI is a separation methodology that is known for more than 40 years (J. Newman et al, 1971). Just to name a few, U.S. Pat. Nos. 5,799,891, 5,858,199, 5,954,937 and 6,309,532 are all intended to commercialize the CDI technique. Particularly, '532 issued to Tran et al disclosed the use of electrical discharge for regenerating electrodes. Rather than reclaiming the residual energy, the electricity is dissipated by shorting or reverse polarity (claims 4, 18, 21, and 23). Shorting a fully charged capacitor may cause electrical hazards particularly when the energy accumulated is immense. It is known to people skilled in the art that reverse polarity would momentarily expel the adsorbed ions from the electrodes. However, the ions would leave one electrode and then be adsorbed by the other electrode, unless an alternate polarity reversal of appropriate frequency is applied in conjunction with a large quantity of fluid for flushing the desorbed ions out of the cell. This may explain why 40 liters of liquid was used for every cycle of regeneration in Example 1 of '532. In addition, one cycle regeneration of the CDI electrodes of '532 takes several hours to accomplish, such lengthy process is unprofitable for commercial application. As indicated by FIG. 12 of '532, deionization as proposed was equally slow as a reduction of TDS by 59 ppm (100 $\mu$S divided by conversion factor 1.7) using 150 pairs of 10×20 cm$^2$ electrodes, or a total geometric area of 30,000 cm$^2$, took 10 minutes of processing time. Moreover, '532 taught a serpentine liquid flow pattern in a complex cell as shown by FIG. 3 wherein 150 pairs or other combination of electrodes were stacked and compressed. For creating the liquid path, apertures were specifically fabricated on the electrode supports whereon carbon aerogel, lithographically perforated metal, or costly metal carbides were used as the electrosorptive medium. Usage of the foregoing designs and materials will add cost to the CDI cells and present difficulties to operation, as well as maintenance. In comparison, disclosures of the present invention will furnish cost-effective, high-throughput, and user-friendly deionizers for purifying contaminated liquids and for desalinating seawater. After partial or complete adsorption of ions, the deionizers can be discharged at different rates to deliver constant currents or peak currents to different loads as required. In other words, the deionizers can be utilized as liquid purifiers, as energy-storage devices, and as power converters.

SUMMARY OF THE INVENTION

Practically, CDI has adopted the charging mechanism of supercapacitor (other nomenclatures for the device include ultracapacitor and electric double layer capacitor) for removing ions from solutions in this invention. Supercapacitor is an electrochemical capacitor that can store static charges up to several thousands of farad (F), and it can be charged and discharged quickly. As the electrodes of supercapacitor accumulate ions on their surface, a DC potential is developed with increasing charges across the positive and negative electrodes of the capacitor. Such voltage rise with ion accumulation relationship is also observed during deionization by CDI process. Therefore, voltage can be used to determine if the CDI electrodes have reached an adsorption maximum, or they have reached an equilibrium state where the induced potential is equal to the applied voltage. In either case, the CDI electrodes require regeneration for further service. Following the general electrode configurations of supercapacitors, that is, stacking or winding, the CDI electrodes are similarly constructed and assembled into modules but with two variations. Firstly, unlike the separators reserve electrolytes for the supercapacitors, components other than the electrosorptive medium in the CDI modules should neither adsorb nor retain ions. Secondly, unlike the electrodes of supercapacitors are enclosed in protecting housings, the CDI electrodes are merely secured by simple means such as tape without encapsulation. Hence, the CDI electrodes of the present invention are widely open to the surroundings, and fluids to be treated have free access to the electrodes. With the foregoing flow-through design, the CDI modules can be placed in fluid conduits for deionization, or they can be submerged in liquids and cruised like a submarine to remove ions.

Not only the electrodes are assembled using the minimal amount of supporting materials, readily available activated carbon of low price is also used as the electrosorptive medium for further reducing the cost of CDI modules. Carbon material is deposited onto an electrically conductive substrate by an inexpensive process such as roller coating to form the CDI electrodes. With cost-effective materials, easy fabrication of electrodes, and simple assembly of electrodes, the deionizers can become reliable consumer products affordable to families and industries.

Just like the stored energy of supercapacitors can be quickly extracted via discharge, the residual energy of the CDI electrodes after electrosorption of ions is also available for fast tapping. Though the energy that is reclaimed is far less than the energy that is input for deionization, the residual energy is free and addible for practical applications. Besides, same as the supercapacitors having 100% discharge depth, the energy stored on the CDI electrodes can be completely drained as well, and the electrodes are thoroughly cleaned as a consequence of energy recovery. To store the residual energy reclaimed from the CDI modules, supercapacitors, or ultracapacitors, or electric double layer capacitors are particularly well suited as the storage devices. This is due to the devices are more efficient in storing energy than other devices such as batteries and flywheels. As long as the source voltage is higher than the voltage of supercapacitors, the capacitors can always be charged regardless of the magnitude of charging current. When the CDI modules are installed on a carousel or Ferris wheel, the electrodes can then be reciprocally and continuously engaged in deionization and regeneration. Because of swiftly recurrent deionization and regeneration, the deionizers have high throughputs for purifying contaminated liquids as well as for desalinating seawater. It is experimentally observed that the repeated deionization and regeneration cause no damage to the deionizers.

Restoration of the CDI electrodes by energy extraction is operational in any liquids including seawater. Only the adsorbed ions are discharged to a liquid, thus the liquid has no influence on regeneration and there is no second pollution. Furthermore, no flushing liquid or regenerant fluid is required to discharge the ions for they are automatically dissipated at energy recovery. Except a minimal amount of clean liquid may be needed to rinse the electrodes, the regeneration produces no waste liquid. Ions are adsorbed by the CDI electrodes under a DC electric field whereby the applied voltage can be controlled below the decomposition potentials of ions. Thence, the CDI electrodes may be utilized as a magnet to non-destructively take ions out of liquids and to place them in a concentrating container. Once the ions are concentrated in a small volume of liquid, useful resources can be easily recycled or the sludge can be effectively disposed. It is during the period when the restored electrodes are returned from the concentrating container to the deionization chamber that rinsing may be required.

Deionization of solutions by CDI only requires the application of low DC voltages, thus it is operable by batteries, fuel cells, and solar cells. Most of the latter devices have poor power densities. Nevertheless, after the residual energy is stored in supercapacitors, the capacitors can then deliver peak powers to various heavy loads. From this aspect, the deionizers behave as power converters using adsorption and desorption for energy transference. Because of various electrical resistances and other forms of energy loss such as electrolysis, the cycle of adsorption and desorption, or charge and discharge is not a perpetual motion. Nevertheless, using the deionizer of this invention as a power converter may provide some practical applications.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

There are two major functions by which activated carbon removes contaminants from liquids, and they are surface adsorption and catalytic reduction. Adsorption generally occurs via some kind of affinity between the contaminants and the adsorbing surface. Since the adsorptive forces are weak and the adsorption is subject to a slow thermodynamic control, activated carbon has to rely on its large surface area and the infinitesimal proximity between its surface and the contaminants for massive purification. However, under the application of a DC electric field, adsorption on activated carbon can be expedited. Also, due to the polarity built on the surface of activated carbon, the carbon will adsorb ions of opposite polarity and a selective adsorption is created. With large surface area, the charged carbon can quickly adsorb a large number of ions. Even without the application of an electrical field, the adsorbed ions can still remain on the surface of activated carbon for a period of time. The foregoing features make activated carbon attractive as an electrosorptive material for liquid purification. Large surface area is the primary reason that activated carbon is commonly used for fabricating energy-storage devices such as supercapacitors, as well as for deionization and desalination. Other considerations that activated carbon is preferred include inert nature, wide availability, mature technology, and low price. In addition, when carbon nanotube (CNT) is available in large quantity of suitable cost, CNT would be another ideal candidate as the electrosorptive material for the CDI electrodes.

Figure 1A:
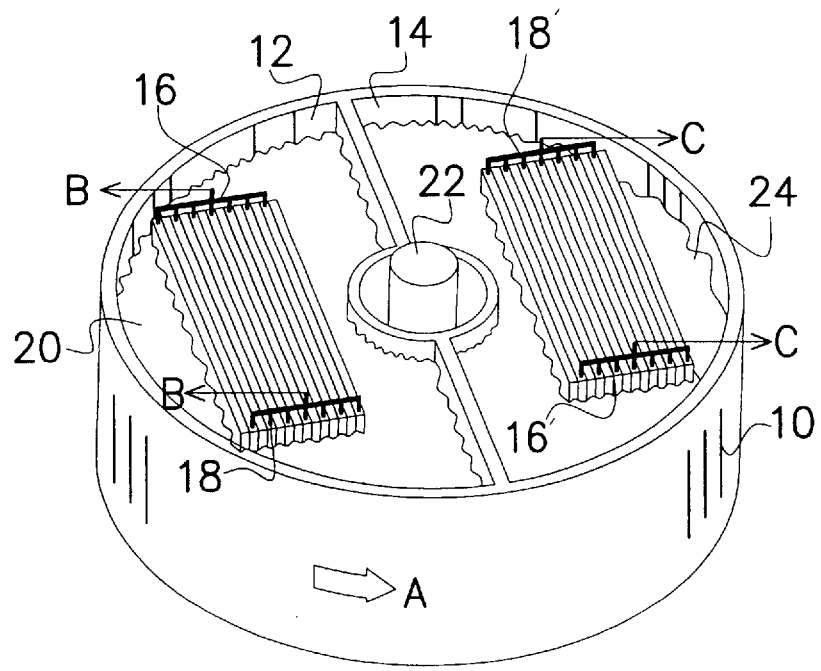
FIG. 1A is the first top view of two CDI electrode modules installed in a two-compartment carousel. One compartment is designated for deionization, and the other for regeneration. As the carousel rotates, the regenerated electrode module will perform deionization while the saturated module will undergo regeneration.

FIG. 1A shows a preferred embodiment of the invention wherein two electrode modules consisting of 7 pairs of electrodes each are placed in a two-compartment carousel 10. The compartment 12 contains a liquid 20 to be treated and a first electrode module having electrodes connected in parallel to form an anode 16 and a cathode 18, respectively. By using electrical cables, the anode 16 and the cathode 18 are connected to the corresponding positive and negative poles of a DC power source B, electricity is then supplied to the module for deionizing the liquid 20. Similarly, the compartment 14 contains a liquid 24 as a regeneration medium and a second electrode module, which had been used for deionization, for discharging its residual energy to load C through an anode 16' and a cathode 18'. The liquid 24 can be a clean solvent or the same liquid as 20 to provide a medium for the adsorbed ions to be discharged. The medium will have no influence on ion discharge or energy extraction. The carousel 10 has a motor (not shown) built at the bottom of a central pole 22 for rotating the electrode modules in the direction indicated by A. As soon as one module is saturated and the other is fully restored, they will be switched positions for a new cycle of electrosorption and regeneration. Before rotating the carousel, the liquids 20 and 24 are drained (liquid conduits and control valves are not shown) so that new liquids of 20 and 24 can be refilled into the compartments 12 and 14 for deionization and regeneration, respectively. If the liquid 20 has a low salt content and can be purified in one cycle of deionization, the purified liquid is retreated for use or for disposal to sewer. Whereas the liquid 24 can be recycled indefinitely to collect ions released during regeneration.

Another preferred embodiment of provision for the recurrent deionization and regeneration, or sorption and desorption, is by lifting the electrode modules up and switching their positions for deionization and regeneration. In this operation, both chambers 12 and 14 as well as liquids 20 and 24 are stationary so that the liquid 20 can be continuously deionized until it is acceptable for release, while the liquid 24 can be used for receiving the released ions indefinitely. If necessary, the restored CDI module may be rinsed with a pure liquid before being placed back for the next run of deionization. After rinsing, the waste liquid may be added to the reservoir of liquid 24 as a regeneration medium. Though only two compartments and two electrode modules are shown in FIG. 1A, other numbers of compartments and CDI modules can be used to meet application needs. Using recurrent deionization and energy extraction, the present invention can thus co-generate purified liquids and electricity.

As shown in FIG. 1A, the modules comprise 7 pairs of stacking electrodes connected in parallel. There is an insulating spacer in the form of screen, mesh, net, network, web or comb (not shown) interposed between every two electrodes to prevent electrical short. To serve its purpose, the spacer should be inert, non-adsorptive, and non-leachable. Materials such as PE (polyethylene), PP (polypropylene), PVC, Teflon and Nylon may satisfy the foregoing requirements. Preferably, the spacer should have a width smaller than 0.2 mm, preferably from 0.05 mm to 0.1 mm, to allow free pass of liquids. Activated carbon made from precursors such as coconut shell, pitch, coal, polyurethane, and polyacrylonitrile (PAN) can be employed as the electrosorption medium. Moreover, carbon nanotube (CNT) with appropriate tube diameters, for example, from 2 nm to 50 nm, is an ideal material for preparing the CDI electrodes. Mixed with a fluorinated binder and a solvent, powder of activated carbon or CNT is converted to a homogeneous paste suitable for roller coating on substrates. Titanium foil of 0.05 mm or less is used as the substrate for anodes, while copper foil of 0.02 mm or less for preparing the cathodes. Suitable metal leads are attached to the electrodes by spot welding or soldering. Electrodes are then stacked with a screen spacer disposed between every two electrodes. Using an insulating tape, or two plastic plates and at least two bolts and two nuts (not shown in FIG. 1A), the whole stack of electrode and spacers are secured to form a CDI module. Assembled without encapsulation as aforementioned, the module may be submerged in liquids to be treated for deionization. In addition, if the electrodes and spacers can be spirally wound into an open roll, it can be installed in conduits for deionizing liquids that flow freely through the electrodes. The CDI electrodes may be connected in parallel for higher surface area, or in series for higher applied voltage, or in hybrid mode for a special need.

Figure 1B:
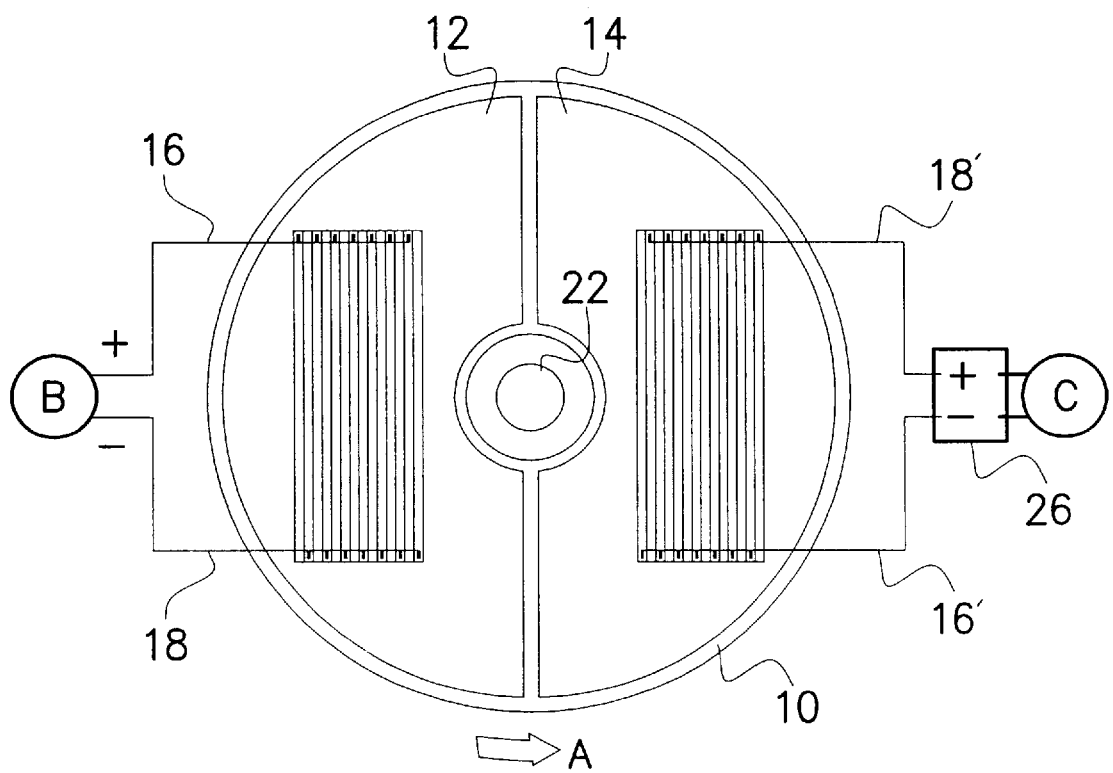
FIG. 1B is the second top view of the two-compartment carousel. It shows one electrode module can receive electricity from power supply B for deionization, and the other module can release its residual energy to load C.

FIG. 1B is another top view of the deionizer with energy recovery. B is a DC power source that includes rectified AC power, batteries, solar cells, and fuel cells. Only a DC voltage of 1~3V is required to sustain electrosorption of the CDI module in compartment 12 of carousel 10. However, a higher voltage may be used to provide both electrosorption and electrolysis with benefits more than just deionization. As disclosed in U.S. Pat. No. 6,328,875 issued to Zappi et al, which is incorporated herein as reference, disinfection of microorganisms and organic pollutant was realized by using electrolysis. Occasionally, electrolysis may be utilized to generate oxidants to prevent fouling of the CDI electrodes. Nevertheless, the present invention is primarily designed for deionization, and electrolysis is generally avoided. Block 26 is a microprocessor that performs three functions: (1) to monitor the potential developed across the electrodes of CDI modules; (2) to activate and deactivate the motor of carousel; and (3) to regulate energy extraction. Load C can extract the residual energy from the CDI module in compartment 14, whereby the CDI module is restored at the same time, through anode 16' and cathode 18'. It is preferably to store the reclaimed energy in devices such as supercapacitors, ultracapacitors, or electric double layer capacitors. Because all of the foregoing capacitors are cable of accepting any magnitude of current without mechanical movement, they have better charging efficiency than batteries and flywheel. Moreover, the capacitors can be fabricated more compact than flywheel. As the potential developed across the electrodes of capacitors equals the source voltage, energy transfer will be ceased. At this point, the CDI module may not be completely regenerated for some residual energy is still present on the electrodes. One way to solve the problem is by using a power bank consisting of many capacitors, or an electronic energy-extractor. In order to minimize loss at energy extraction, the internal resistance or ESR (equivalent series resistance) of the supercapacitors should be as low as possible.

Figure 2A:
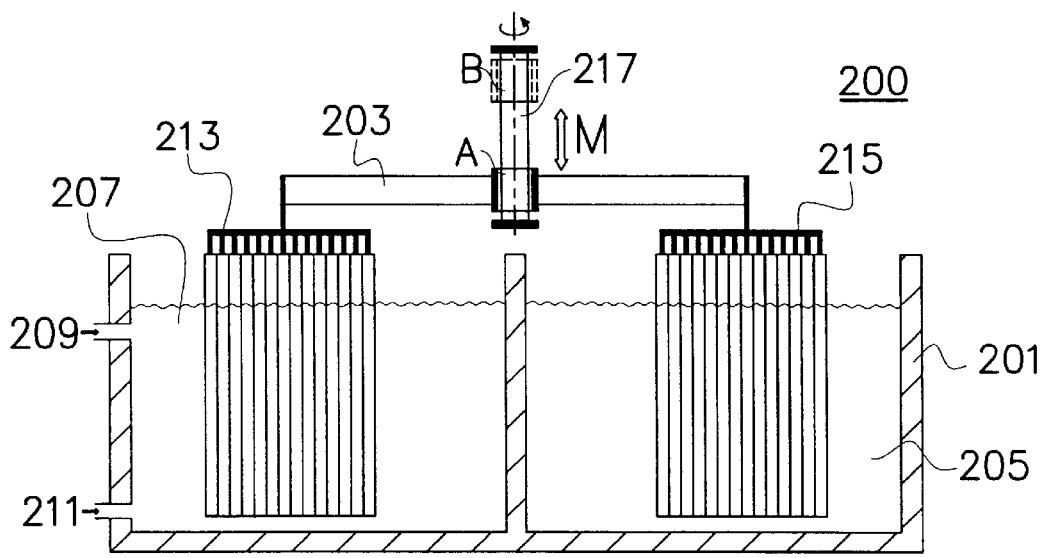
FIG. 2A is a side view of two CDI electrode modules installed in a Ferris wheel. The wheel has both lifting and rotating mechanisms that can switch the modules from deionization to regeneration, or from regeneration to deionization as required. Using the Ferris wheel design, only a few sets of CDI modules are sufficient for purifying contaminated liquids and for desalinating seawater.

FIG. 2A is a side view of yet another preferred embodiment of arranging a deionizer with energy recovery in Ferris wheel configuration. For the purpose of simplification, only two compartments 205 and 207, as well as two CDI electrode modules 213 and 215 are shown in container 201. Other accessories including power source, microprocessor and load are omitted for they are similar to those in FIG. 1B. Ferris wheel 200 has motors built inside the central pole 213 to provide lifting motion for the lever 203 with electrode modules 213 and 215 from position A to position B, and to switch the CDI modules from deionization to regeneration or vice versa. Nevertheless, the distance between A and B is not drawn to reflect the real size that allows enough clearance for the CDI modules to be rotated. Compartment 205 is designated for regeneration wherein a pure liquid or the same solution as liquid to be treated in compartment 207 is used indefinitely as regeneration medium. Compartment 207 is designated for deionization wherein contaminated liquids or seawater can enter the compartment by inlet 209 and exit the compartment from outlet 211 once they are purified. Due to two simple movements are demanded, motors of Ferris wheel 200 should consume little amount of energy and they may be operated by the same power source that sustains deionization.

Figure 2B:
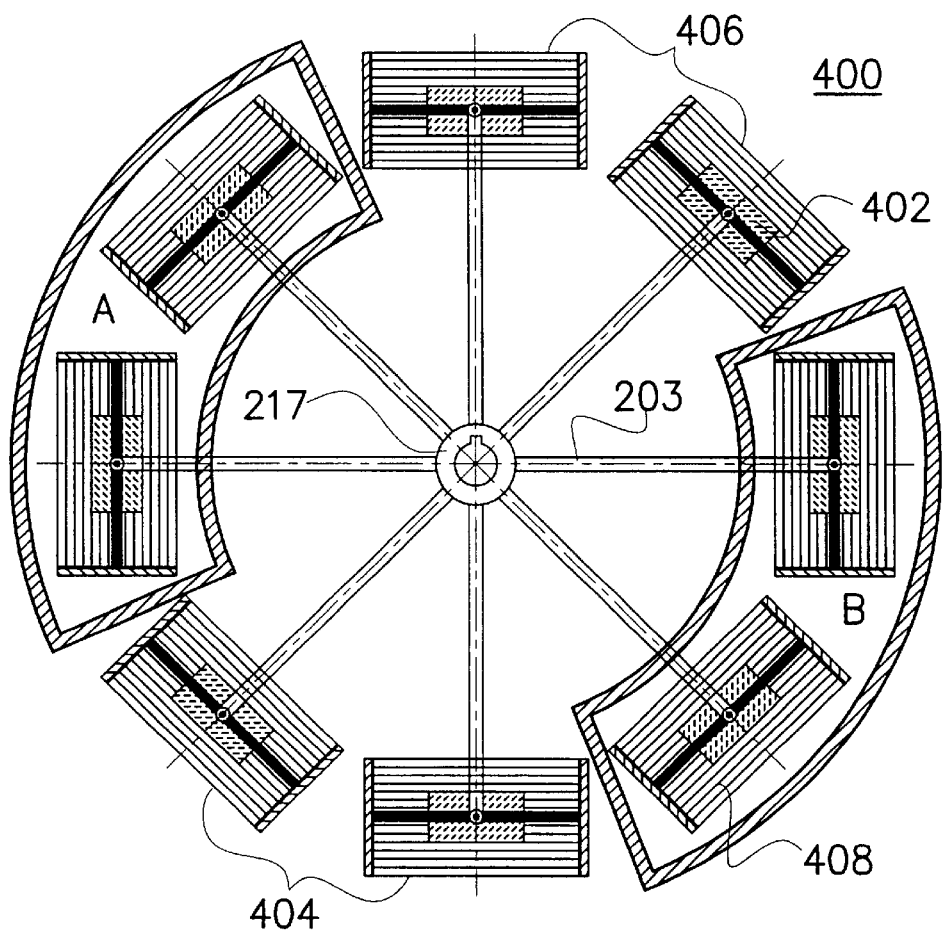
FIG. 2B is a top view of a Ferris wheel containing 8 compartments and 8 CDI modules. The compartments are divided into three zones for deionization, regeneration, and post-treatment.

FIG. 2B shows a Ferris wheel 400 containing 8 compartments with 8 CDI modules represented by 408. On each module, there is a control module represented by 402 containing a microprocessor and a step-up circuitry for draining the residual energy of the CDI module. Each module is mounted to a lever represented by 203 where a control module is disposed on the top of the CDI module. The control module can monitor deionization, activate and deactivate mechanical movements, as well as regulate energy extraction. There are motors built inside the central pole 217. The compartments are divided into 4 sections where 404 is for deionization, 406 for regeneration, areas A and B are waiting quarters for the CDI modules to be treated for minimizing cross contamination.

Figure 3:
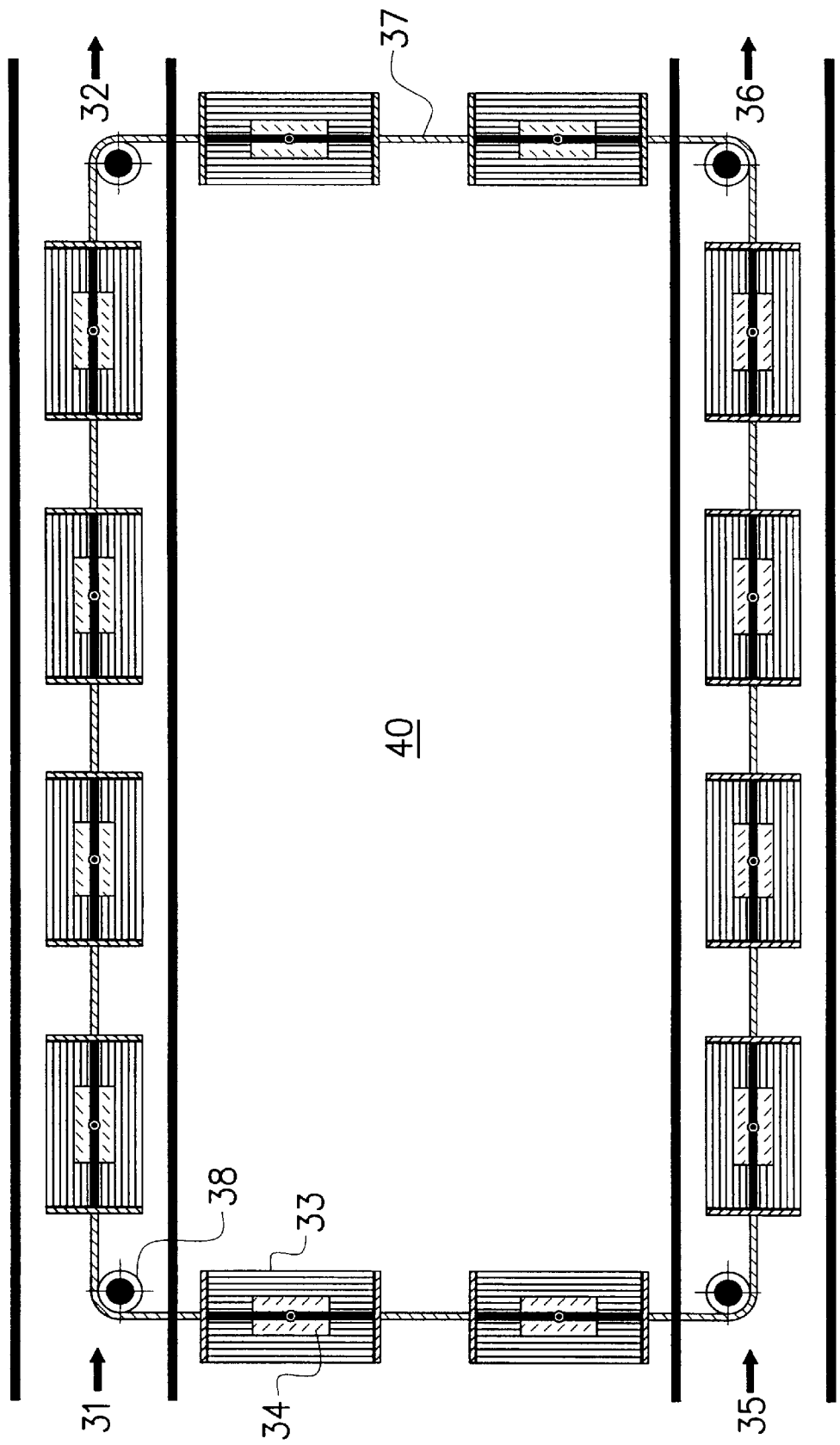
FIG. 3 is a side view of another type of Ferris wheel where a conveyor carrying cylindrical CDI modules. There are three sections for deionization, regeneration, and post-treatment.

FIG. 3 is still another preferred embodiment wherein a moving belt 37, which is engaged by rollers represented by 38, carrying a number of CDI modules represented by 33 in cylindrical form for recurrent deionization and regeneration. Both liquids to be treated 31 and regeneration medium 35 can flow freely through the CDI electrodes. After deionization, fluent 32 may become a purified liquid, while fluent 36 will be enriched by the ions discharged at regeneration. As in FIG. 2B, each CDI module is equipped with a control module represented by 34. Area labeled 40 is the waiting quarter where the CDI modules are post-treated to reduce cross contamination.

Figure 4:
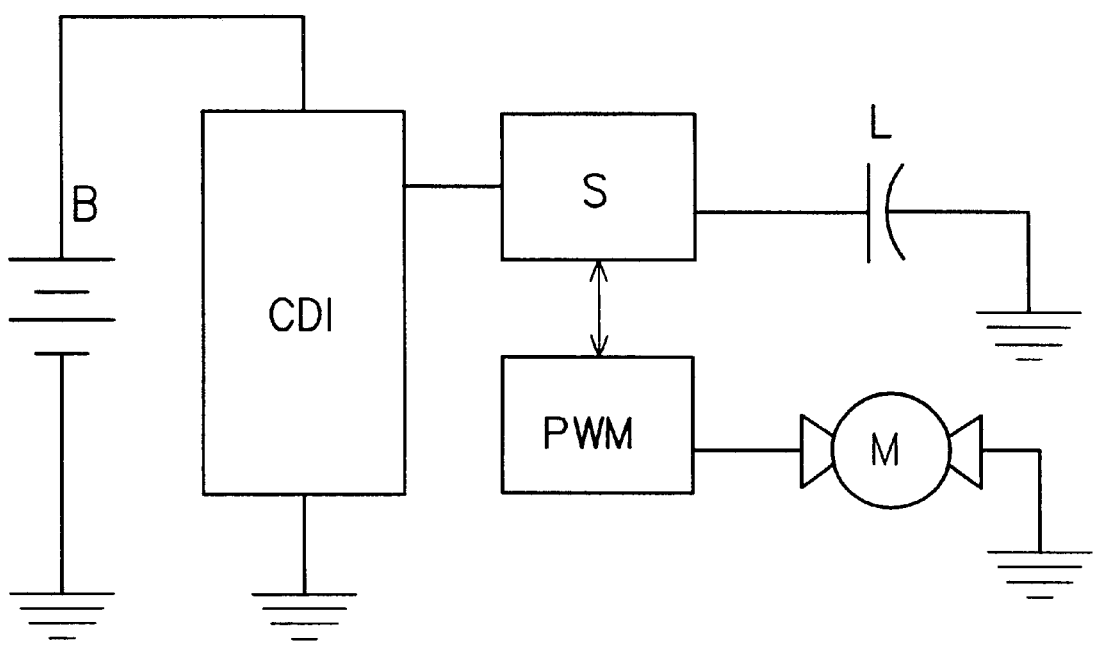
FIG. 4 is a control module that is composed of a step-up circuitry, a microprocessor and a supercapacitor.

FIG. 4 is the diagram of the foregoing control module that is composed of a step-up circuitry S, a microprocessor PWM and a supercapacitor L. In FIG. 4, B is a DC power source to provide electricity to CDI for deionization. Then, the residual energy of CDI can be discharged via S to supercapacitor L. Normally, S is off until the potential of CDI is equal or smaller than the voltage of L. When the latter situation occurs, microprocessor PWM will raise the potential of CDI through S to above the voltage of L to completely drain the residual energy of CDI. Using an electronic energy extractor as PWM and S, electrodes of CDI can be quickly restored. The microprocessor PWM also activates and deactivates motor M so that the CDI modules can be switched to the desired positions.

Instead of using an automatic carousel or Ferris wheels setup, the CDI modules in the following examples are switched between deionization and regeneration manually. Experimental are presented to demonstrate that the CDI modules can 1) directly purify seawater or waste liquids with higher salt content; 2) undergo numerous cycles of sorption and desorption without degradation; and 3) convert the power density of a power source.

EXAMPLE 1

A CDI module is composed of 4 cells connected in series wherein each cell consists of 2 parallel electrodes with a PVC screen disposed in the middle. Each electrode has a dimension of 6 cm×5 cm×0.35 mm and uses one activated carbon (surface area 1050 $m^2/g$ at $0.30 per pound) as the electrosorptive medium. The module is placed in seawaters of different salt content, namely, 5,000 ppm, 20,000 ppm and 35,000 ppm (original) for potentiostatic deionization using 8 DC volt. As the potential developed across the cells reaches 8V and current has declined to a steady value, the deionization is terminated. Then, the residual energy of the module after deionization performed on each solution is discharged to an electronic load. Recovery efficiency of each energy extraction is calculated and listed in Table 1:

TABLE 1

Recovery Efficiency of the Residual Energy after CDI

| Seawater (ppm) | Energy Input (Joule) | Energy Recovered (Joule) | Efficiency (%) |
|---|---|---|---|
| 20,000 | 3.42 | 0.22 | 6.5 |
| 35,000 | 5.27 | 0.98 | 18.5 |

Energy transfer in the 5,000 ppm seawater is too little to be measured. It appears that the recovery efficiency is higher with higher salt content.

EXAMPLE 2

The same CDI module as Example 1 is fully charged in 35,000 ppm seawater as Example 1. Afterwards, the residual energy is used to charge two commercial supercapacitors, and Table 2 shows the charged status the capacitors,

TABLE 2

Residual Energy of CDI Stored in Supercapacitors

| Supercapacitor Specification | Voltage Developed (V) | Peak Current Delivered (A) |
|---|---|---|
| 2.5 V × 20 F | 1.9 | 4.1 |
| 2.5 V × 100 F | 0.45 | 9.5 |

As shown in Table 2, the residual energy after CDI can be saved for practical applications, and supercapacitors are well suited for the applications.

EXAMPLE 3

The same CDI module as Example 1 is fully charged in 35,000 ppm seawater using a constant current of 5A. Immediately after the termination of charge, the module is discharged to an electronic load where a peak current of 39A is measured. Therefore, the CDI module behaves as a power converter for the peak current is much higher than the charge current.

EXAMPLE 4

A new CDI module is prepared by connecting 32 pieces electrodes of 6 cm×5 cm×0.35 mm in parallel to form one anode and one cathode. The electrodes use the same activated carbon as Example 1 as the electrosorptive medium. The module is used for directly removing ions of a waste liquid with a salt content of 122,000 ppm from a dye factory. In each cycle of process, the module is applied 3 DC volt for 5 minutes for deionization, then the module is discharged quantitatively to an electronic load with the module immersed in a regeneration medium, which is DI water, in a separate container. Only the first six consecutive cycles of deionization and regeneration is shown in Table 3.

TABLE 3

Purification of a 122,000 ppm Waste Liquid by Recurrent Deionization and Regeneration

| # | Original Liquid (ppm) | Δ ppm | Regeneration Liquid (ppm) | Δ ppm |
|---|---|---|---|---|
| 1 | 116,500 | 5,500 | 7,000 | — |
| 2 | 110,000 | 6,000 | 14,200 | 6,500 |
| 3 | 105,000 | 5,000 | 21,100 | 6,900 |
| 4 | 101,000 | 4,500 | 27,750 | 6,650 |
| 5 | 95,500 | 5,500 | 33,000 | 5,250 |
| 6 | 89,500 | 6,000 | 38,000 | 5,000 |

Theoretically, column 3 and column 5 of Table 3 should contain the same numbers the discrepancy may be due to cross contamination and/or measurement errors. Nevertheless, Table 3 clearly demonstrates that the CDI module in conjunction with the recurrent deionization and regeneration can directly and continuously purify liquids with extremely high salt content. Furthermore, the amount of ions removed in each cycle is significant indicating that the present invention is a very useful separation technique.

On the other hand, when the deionizer of this invention is used as a power converter, the electrolyte used in the power converter may contain cations selected from the group consisting of $H^+$, $NH_4^+$, alkali metal, alkali earth metals, transition metals, and the combinations thereof. The electrolyte may contain anions selected from the group consisting of $OH^-$, halides, $NO_3^-$, $ClO_4^-$, $SO_3^{2-}$, $SO_4^{2-}$, $PO_4^{3-}$, and the combinations thereof. In addition, the electrolyte may use a solvent selected from the group consisting of water, methanol, ethanol, acetone, acetonitrile, propylene glycol, propylene carbonate, ethylene carbonate, and the combinations thereof. A protection case is also required to hermetically seal the electrode module in the power converter.

The above description in conjunction with various embodiments is presented only for illustration purpose. There are many alternatives, modifications and variations that are apparent to persons skilled in the art in light of foregoing detailed description. It is intended to include all such alternatives in the spirit and scope of the appended claims.

What is claimed is:

1. A power converter, comprising:

an electrode module containing an anode, a cathode and at least one ionically conductive spacer interposed between the anode and the cathode to prevent electrical short and to maintain ion transfer between the electrodes;

an electrolyte in liquid for providing anions and cations for reversible adsorption and desorption on the electrodes; and a protection case for hermetically sealing the electrode module.

2. The power converter of claim 1, wherein the electrode module containing a plurality of electrodes that are stacked and connected in parallel or in series to form the anode and the cathode, while the ionically conductive spacer is interposed between every two electrodes.

3. The power converter of claim 1, wherein the anode, the cathode and two ionically conductive spacers spirally wound into a roll.

4. The power converter of claim 1, wherein the electrolyte has a salt content of 5,000 ppm or higher.

5. The power converter of claim 1, wherein the electrolyte contains cations selected from the group consisting of $H^+$, $NH_4^+$, alkali metal, alkali earth metals, transition metals, and combinations thereof.

6. The power converter of claim 1, wherein the electrolyte [conains]includes anions selected from the group consisting of $OH^-$, halides, $NO_3^-$, $ClO_4^-$, $SO_3^{2-}$, $SO_4^{2-}$, $PO_4^{3-}$, and combinations thereof.

7. The power converter of claim 1, wherein the electrolyte uses a solvent selected from the group consisting of water, methanol, ethanol, acetone, acetonitrile, propylene glycol, propylene carbonate, ethylene carbonate, and combinations thereof.

* * * * *